(12) United States Patent
Kurtz et al.

(10) Patent No.: US 10,821,603 B2
(45) Date of Patent: Nov. 3, 2020

(54) METHODS AND APPARATUS FOR ROBOT CONTROL

(71) Applicant: The Boeing Company, Chicago, IL (US)

(72) Inventors: Tyler Kurtz, Summerville, SC (US); Edward Hojnacki, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 240 days.

(21) Appl. No.: 16/122,514

(22) Filed: Sep. 5, 2018

(65) Prior Publication Data

US 2020/0070340 A1    Mar. 5, 2020

(51) Int. Cl.
*B25J 9/16*    (2006.01)

(52) U.S. Cl.
CPC ............ *B25J 9/163* (2013.01); *B25J 9/1605* (2013.01); *B25J 9/1664* (2013.01); *B25J 9/1679* (2013.01)

(58) Field of Classification Search
None
See application file for complete search history.

(56) References Cited

U.S. PATENT DOCUMENTS

| | | |
|---|---|---|
| 2013/0006421 A1 | 1/2013 | Brogardh |
| 2014/0277722 A1 | 9/2014 | Nagai et al. |
| 2018/0126553 A1 | 5/2018 | Corkum et al. |

FOREIGN PATENT DOCUMENTS

| | | |
|---|---|---|
| DE | 10351669 A1 | 6/2005 |
| EP | 3067166 A1 | 9/2016 |

OTHER PUBLICATIONS

European Patent Office, "European Search Report", issued in connection with European Patent Application No. 19195479.1, dated May 12, 2020, (189 pages).
B. Siciliano, L.Sciavicco, L.Villani, G.Oriolo: "Robotics", Nov. 20, 2008 (Nov. 20, 2008), Springer, XP002797979, ISBN: 978-1-84628-641-4.

*Primary Examiner* — Bhavesh V Amin
(74) *Attorney, Agent, or Firm* — Hanley, Flight & Zimmerman, LLC

(57) ABSTRACT

Methods, apparatus, systems, and articles of manufacture are disclosed for robot control. An example apparatus includes a command generator to instruct a robot to move an end effector from a staging position to an estimated pre-task position to perform a first task based on a first pose of the robot, the first pose based on a model, adjust the robot to a first actual pre-task position to perform the first task when the robot is to move to a second actual pre-task position, the first actual pre-task position proximate the estimated pre-task position, and direct the robot to perform a second task based on a correction factor, the correction factor is to be determined by determining a second pose of the robot, the second pose corresponding to position information associated with a post-task position, and calculating the correction factor based on the first pose and the second pose.

20 Claims, 6 Drawing Sheets

METHODS AND APPARATUS FOR ROBOT CONTROL

FIELD OF THE DISCLOSURE

This disclosure relates generally to robots and, more particularly, to methods and apparatus for robot control.

BACKGROUND

Object recognition systems are being deployed in an array of applications and corresponding devices. Devices such as collaborative robots can use an object recognition system to perform tasks related to assembly or manufacturing. Object recognition systems can guide a robotic arm and end effector to a specified location to perform an assembly task. However, object recognition systems can add increased cost, complexity, and latency to assembly tasks.

BRIEF DESCRIPTION OF THE DRAWINGS

The figures are not to scale. In general, the same reference numbers will be used throughout the drawing(s) and accompanying written description to refer to the same or like parts.

SUMMARY

Figure 1A:
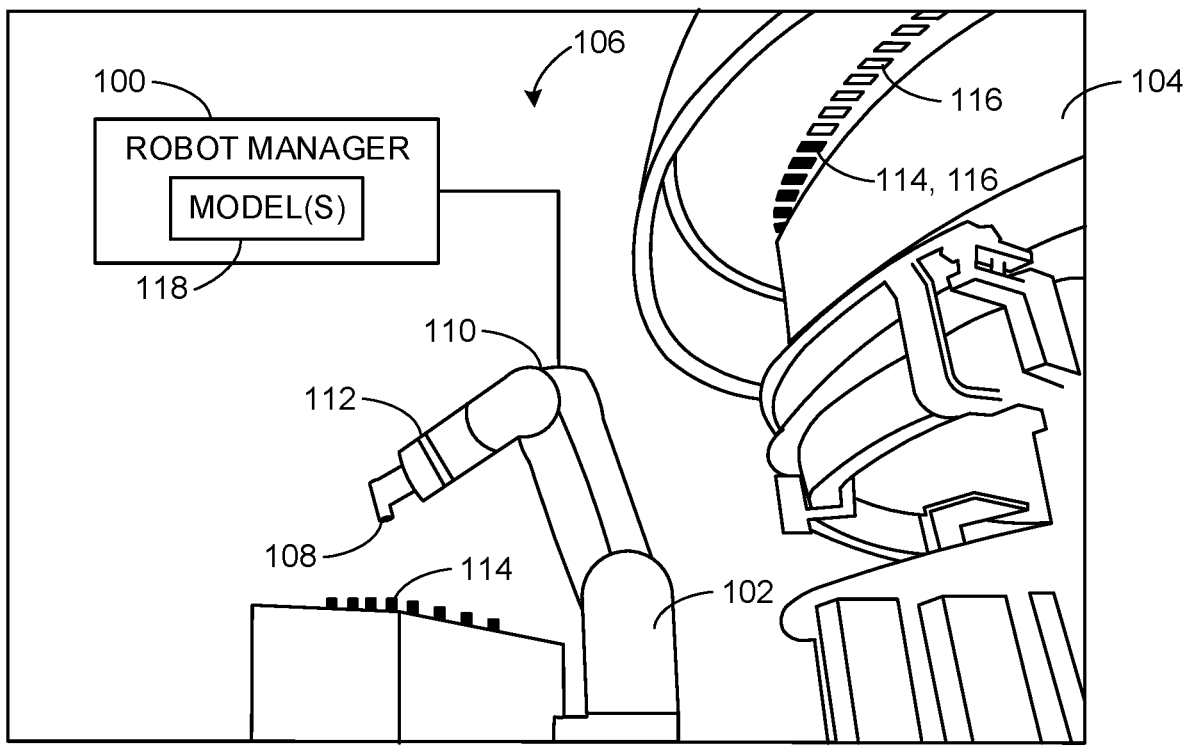
FIGS. 1A and 1B depict an example robot manager controlling an example robot to perform an assembly task on an example assembly.

Systems, methods, apparatus, and articles of manufacture for robot control are disclosed.

An example apparatus disclosed herein includes a command generator to instruct a robot to move an end effector from a staging position to an estimated pre-task position to perform a first task based on a first pose of the robot, the first pose based on a model, adjust the robot to a first actual pre-task position to perform the first task when the robot is to move to a second actual pre-task position, the first actual pre-task position proximate the estimated pre-task position, and direct the robot to perform a second task based on a correction factor, the correction factor is to be determined by determining a second pose of the robot, the second pose corresponding to position information associated with the robot at a post-task position, the post-task position corresponding to position information associated with the robot after performing the first task, and calculating the correction factor based on the first pose and the second pose.

An example non-transitory computer readable storage medium comprising instructions which, when executed, cause a machine to at least instruct a robot to move an end effector from a staging position to an estimated pre-task position to perform a first task based on a first pose of the robot, the first pose based on a model, adjust the robot to a first actual pre-task position to perform the first task when the robot is to move to a second actual pre-task position, the first actual pre-task position proximate the estimated pre-task position, determine a second pose of the robot after performing the first task, the second pose corresponding to position information associated with the robot at a post-task position, the post-task position corresponding to a position of the robot after performing the first task, calculate a correction factor based on the first pose and the second pose, and direct the robot to perform a second task based on the correction factor.

An example method disclosed herein includes instructing a robot to move an end effector from a first position to a second position to perform a first task based on a first pose of the robot, the first pose based on a model, in response to the robot moving to a third position, adjusting the robot to a fourth position to perform the first task, the fourth position proximate the second position, in response to performing the first task, determining a second pose of the robot, the second pose corresponding to position information associated with the robot at a fifth position, the fifth position corresponding to a position of the robot after performing the first task, calculating a correction factor based on the first pose and the second pose, and directing the robot to perform a second task based on the correction factor.

DETAILED DESCRIPTION

Typical robots used for industrial assembly or manufacturing operations, such as collaboration robots, utilize and/or otherwise rely on external sensors or additional sensors to a primary sensor associated with an end effector of the robot for localization. A collaborative robot, also referred to as a cobot or co-robot, is a machine intended to physically interact with humans in a shared workspace. In some instances, the co-robot is programmed and/or otherwise configured to operate autonomously or with limited guidance. These robots may be used to execute a workflow including one or more assembly operations or tasks at one or more assembly positions. For example, a robot may be used to perform an assembly task of coupling and/or otherwise installing a fastener on an object surface at a location or position of the object surface.

Localization refers to a robot determining a position of the robot within a computer-based model environment that corresponds to a physical environment of the robot. For example, the robot may use feedback from a primary sensor such as an encoder to determine a position, a change in position, etc., of the robot in the physical environment by referencing the computer-based model. In some instances, the robot includes one or more secondary sensor systems to assist with localization determination efforts. For example, the robot may use another encoder (e.g., an optical encoder), a camera (e.g., a camera-based sensor system), a laser, etc., in coordination with the primary sensor to determine the position of the robot.

Some known robots perform sequential assembly tasks using pre-generated trajectories, where each one of the trajectories includes a starting position and an end position. In some instances, the known robots may not successfully complete an assembly task because of an uncertainty of the robot localization satisfying an uncertainty threshold. The known robot may determine that the assembly task cannot be successfully completed because the difference between an actual robot pose (e.g., an actual robot position), and an expected robot pose (e.g., an expected robot position) is greater than the uncertainty threshold. For example, the known robots may cause a collision of an end effector of the robot with an assembly due to the known robot being unable to reliably determine position information of the robot with respect to the physical environment.

As used herein, the term "pose" refers to position information including at least one of an orientation or a position of an object (e.g., the end effector, one or more joints of the robot, etc.) relative to a (defined) coordinate system. In some instances, the pose is described by means of a rotation transformation and/or a translation transformation that can bring an object from a reference pose, or an estimated pose, to an actual pose, or an observed pose. In some instances, the rotation and/or translation transformation information can be represented by one or more rotation matrices, translation matrices, etc. In some instances, the rotation and/or translation transformation information can be represented by one or more rotation quaternions, translation quaternions, etc. In some instances, a robot may move from a first pose to a second pose by following a trajectory linking and/or otherwise connecting the first pose to the second pose, moving to one or more waypoints along the trajectory, etc. For example, a trajectory may refer to a motion path of an end effector of the robot to include motion of various robot arm portions, angles, velocities, etc., and/or a combination thereof.

In some instances, known robots may use the secondary sensor system to adjust the actual robot pose to the expected robot pose to facilitate completion of the assembly task. For example, known robots may intend to move to a first position in a physical environment, where the first position is based on the model, but move to a second position in the physical environment due to dimension differences of the robot in the physical environment compared to the robot in the model environment, tolerance stack-ups, etc. In such examples, a first pose at the first position is the estimated robot pose and a second pose at the second position is the actual robot pose. The known robots may use the secondary sensor system to move the robot from the second position to the first position to perform the assembly task by calculating a correction factor or a localization offset. The known robots may calculate a correction factor and perform such an adjustment after performing each assembly task, where the calculated correction factor is different from one assembly task to the next.

However, the secondary sensor system adds additional material cost and maintenance cost to these known robots. The secondary sensor system also adds increased computational cost and development cost because of increased complexity in programming these known robots to incorporate a system associated with the sensor. The known robots are adversely affected by using and/or otherwise relying on the secondary sensor system to perform an operation because of increased execution time required to obtain sensor data, process sensor data, and generate localization information based on the processed sensor data.

Examples disclosed herein include an example robot manager for robot control by determining and applying a localization offset to a robot trajectory when a robot performs a task. In some disclosed examples, the robot manager generates a computer-based model that includes estimated poses, trajectories, etc., associated with the robot sequentially performing a workflow including a plurality of assembly tasks (e.g., 10 assembly tasks, 100 assembly tasks, 1000 assembly tasks, etc.) without user or third-party intervention. In some disclosed examples, prior to the robot initiating and/or otherwise performing the workflow, a user guides the robot to a first assembly position (e.g., a first pre-task position, a first pre-manipulation position, etc.) associated with performing a first assembly task included in the workflow. After guiding the robot to the first assembly position, the user verifies that the robot is in the accurate position to perform the first assembly task. In some disclosed examples, the robot manager calculates a first actual pre-task pose of the robot at the first pre-task position. The first actual pre-task pose may refer to a position of the robot prior to performing an assembly task such as torquing a collar onto a bolt.

When the user verifies the position, the robot manager instructs the robot to perform the first assembly task. When the robot performs the first assembly task, the robot moves to a post-task position (e.g., a post-manipulation position) and the robot manager calculates a first actual post-task pose of the robot. The first actual post-task pose may refer to a position of the robot after performing the assembly task such as torquing the collar onto the bolt. The robot manager calculates the first actual pre-task pose and the first actual post-task pose of the robot by obtaining measurements from a sensor monitoring an end effector of the robot. The robot manager calculates a localization offset by comparing at least one of (1) the first actual pre-task pose to a first estimated pre-task pose or (2) the first actual post-task pose to a first estimated post-task pose, where the first estimated pre-task pose and the first estimated post-task pose are determined by the computer-based model. For example, the localization offset may be defined by rotation and/or translation transformation information that is represented by one or more rotation quaternions, translation quaternions, etc. In some examples, the localization offset corresponds to a localization offset pose, where the robot manager 100 is to determine a trajectory from a current estimated pose to the localization offset pose.

In some disclosed examples, the robot manager performs the plurality of assembly tasks based on the localization offset without further user intervention. For example, the robot manager may instruct the robot to perform a second assembly task, a third assembly task, etc., based on the localization offset. The robot manager may instruct the robot to move to a second estimated pre-task pose associated with performing the second assembly task. In response to the instruction to move to the second estimated pre-task pose, the robot may move along a first trajectory to move from a home pose to a second actual pre-task pose, where the first trajectory is determined by the computer-based model. When the robot completes the first trajectory, the robot manager applies the localization offset to the first trajectory to adjust the position of the robot. For example, the robot manager may instruct the robot to move along a second trajectory to move from the second actual pre-task pose to a third actual pre-task pose, where the second trajectory is determined by applying the localization offset to the first trajectory and the third actual pre-task pose is proximate the second estimated pre-task pose. In such examples, the robot manager facilitates a performance of the second assembly task and subsequent assembly tasks by using the localization offset without user intervention or a secondary sensor system to calculate additional localization offsets.

FIG. 1A depicts an example robot manager 100 controlling an example robot 102 to perform an assembly task on an example assembly 104 in an example environment 106. In FIG. 1A, the robot manager 100 is external to the robot 102. Additionally or alternatively, the robot manager 100 may be included in the robot 102. In FIG. 1A, the robot 102 is an impedance control robot (e.g., an impedance control collaborative robot) including an example end effector 108. The robot 102 of FIG. 1A includes one or more actuators 110 (e.g., electric motors, hydraulic pumps, pneumatic pistons, solenoids, valves, etc.) that can be actuated and/or otherwise controlled using one or more processors. The one or more processors may be included in the robot 102 and/or (communicatively) coupled to the robot 102. Alternatively, the robot 102 may be any other type of machine capable of performing an assembly task with or without assistance or input from an operator (e.g., a maintenance personnel, a technician, a user, etc.). In FIG. 1A, the environment 106 is a physical environment that includes the robot 102, the assembly 104, etc. For example, the environment 106 may correspond to an assembly plant, a manufacturing facility, etc.

In FIG. 1A, the end effector 108 is a nutrunner tool (e.g., an electric nutrunner, a pneumatic nutrunner, etc.), or a torque wrench. For example, the nutrunner tool may be used to install and/or otherwise couple components, assembly items, etc., to each other. Alternatively, the end effector 108 may be any other type of item manipulator such as a gripper (e.g., an impactive gripper, an ingressive gripper, an astrictive gripper, a contigutive gripper, etc.), a paint spray gun, a welding head, etc. The robot 102 of FIG. 1A includes one or more example sensors 112 associated with the end effector 108. In FIG. 1A, the sensor 112 is a force-torque sensor. For example, the sensor 112 may measure the force and/or torque along one or more axes (e.g., an X-axis, a Y-axis, a Z-axis, etc.) of the end effector 108 and/or, more generally, associated with an assembly item. Additionally or alternatively, the sensor 112 may be an encoder. Alternatively, the robot 102 may include a sensor such as a camera, an encoder, etc. For example, the robot 102 of FIG. 1A may include a camera-based system (e.g., a system including one or more cameras, video cameras, etc.) communicatively coupled to the robot manager 100 to assist with moving, orienting, etc., the robot 102 when performing a task. For example, the robot 102 may include one or more sensors 112 such as a camera, an encoder, a force-torque sensor, etc., and/or a combination thereof.

In FIG. 1A, the robot 102 is programmed (e.g., one or more processors executing machine readable instructions) and/or otherwise configured to perform one or more assembly tasks associated with the assembly 104. The assembly 104 of FIG. 1A is an air intake for a turbine engine. For example, the assembly 104 may be an aircraft engine inlet. Alternatively, the assembly 104 may be any other type of component, device, structure, etc.

The robot 102 of FIG. 1A is configured to perform one or more assembly tasks associated with the assembly 104. In FIG. 1A, the robot 102 is configured to install and/or otherwise couple a first assembly item including an example collar 114 to a second assembly item including an example bolt 116. Alternatively, the robot 102 may couple any other type of fastener to the assembly 104 or perform any other manipulation task on the assembly 104. In FIG. 1A, the robot 102 is at a first position (e.g., a home position, a starting position, etc.).

In FIG. 1A, the robot 102 may perform an assembly task including traveling to the first position, moving to a second position (e.g., an assembly item collection position, a staging position, etc.) to obtain one of the collars 114 to be processed, traveling to a third position (e.g., a pre-manipulation position, a pre-task position, etc.) proximate one of the bolts 116 to be processed, and moving to a fourth position (e.g., a post-manipulation position, a post-task position, etc.) after coupling the collar 114 to the bolt 116. For example, the pre-task position may correspond to a position of the robot 102 proximate to the bolt 116 to be processed but prior to coupling the bolt 116 to the collar 114 to be processed. The post-task position may correspond to a position of the robot 102 after coupling the bolt 116 to the collar 114. In response to coupling the collar 114 to the bolt 116, the robot 102 may move and/or otherwise return to the first position to perform another assembly task.

Figure 1B:
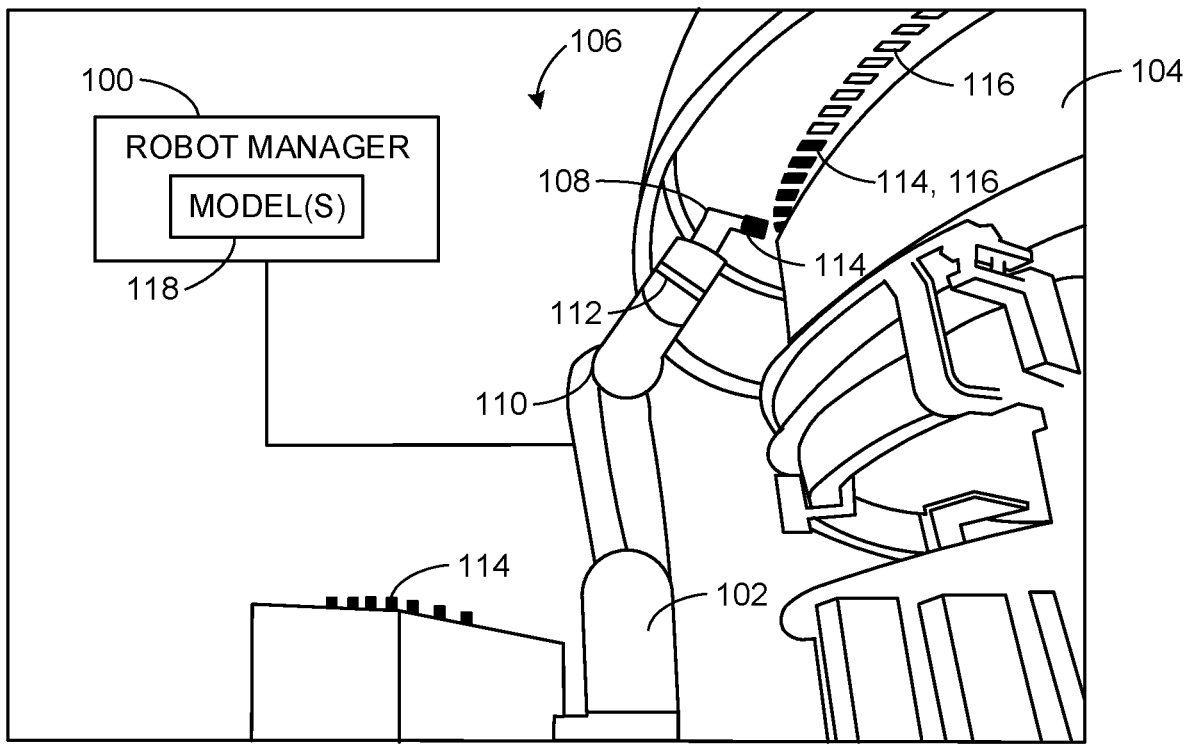

FIG. 1B depicts the robot manager 100 of FIG. 1A controlling the robot 102 of FIG. 1A to perform an assembly task as described above in connection with FIG. 1A. For example, the robot manager 100 may direct and/or otherwise instruct the robot 102 to move from the first position as depicted in FIG. 1A to the second position when moving to obtain the collar 114. In FIG. 1B, the robot 102 is in the third position. For example, the robot 102 is at a pre-task position proximate to the bolt 116 to be processed. The pre-task position may correspond to a pre-manipulation, or a pre-torquing, position, or the position to which the robot 102 moves prior to torquing the collar/nut 114 to the bolt 116.

In operation, the robot manager 100 obtains a workflow including one or more assembly tasks to be performed by the robot 102. For example, a workflow may include a sequence of assembly tasks (e.g., 10 assembly tasks, 100 assembly tasks, 1000 assembly tasks, etc.) associated with one or more example computer-based models 118. The computer-based models 118 may include a computer-aided design (CAD) model of the robot 102, the assembly 104, the collars/nuts 114, the bolts 116, etc. The CAD model may be a two-dimensional (2-D) model, a three-dimensional (3-D) model, etc. For example, the models 118 may include position information (e.g., poses) of the robot 102, the assembly 104, etc., in a model environment corresponding to the physical environment 106 of the robot 102.

In some examples, the robot manager 100 determines that the workflow includes the robot 102 coupling the collars 114 to the bolts 116 at assembly positions corresponding to positions proximate the bolts 116. Additionally or alternatively, the workflow may include different assembly tasks. The robot manager 100 may determine that the workflow includes the sequence of assembly tasks including a first assembly task associated with coupling a first one of the collars 114 to a first one of the bolts 116 at a first assembly position, a second assembly task associated with coupling a second one of the collars 114 to a second one of the bolts 116 at a second assembly position, etc., where the first assembly position is next to and/or otherwise proximate to the second assembly position, the first assembly position is different from the second assembly position, etc. Alternatively, the first assembly position may not be next to and/or otherwise proximate to the second assembly position.

In operation, the robot manager 100 determines assembly positions included in the one or more models 118 that are associated with the bolts 116, and/or, more generally, the assembly 104. For example, the robot manager 100 may determine estimated pre-task positions, estimated post-task positions, etc. The robot manager 100 determines trajectories (e.g., robot trajectories) including one or more joint states, waypoints, etc., based on the assembly positions. In some examples, a joint state may include at least one of one or more angles, one or more coordinates, etc., associated with a position of the end effector 108, a joint (e.g., a coupling point of two or more structural components of the robot 102), and/or, more generally, the robot 102. For example, a joint state of the robot 102 when the robot 102 is at the home position may correspond to an angle of the end effector 108 with respect to a base of the robot 102 in degrees, radians, etc.

In some examples, the robot manager 100 determines a trajectory corresponding to moving the robot 102 from the home position to the staging position, from the staging position to the estimated pre-task position, etc. In such examples, the robot manager 100 may determine a first joint state associated with the home position, a second joint state associated with the staging position, etc. The robot manager 100 may generate and transmit the command to the robot 102 to move the robot from the home position to the estimated pre-task position based on an estimated pre-task pose of the robot 102. For example, the estimated pre-task pose may correspond to a pose of the robot 102 as defined by and/or otherwise represented by the model(s) 118 after moving along a trajectory from the home position to the estimated pre-task position as defined by and/or otherwise included in the model(s) 118.

In operation, prior to the robot manager 100 initiating and/or otherwise performing the workflow, a user may guide the robot 102 along a first trajectory from a first staging position to a first pre-task position to perform a first assembly task. The first staging position may correspond to a position of the robot 102 when obtaining the first one of the collars 114. The first pre-task position may correspond to a first actual pre-task position of the robot 102. When the user moves the robot 102 to the first pre-task position, the user aligns and verifies the first pre-task position of the robot 102 to perform the first assembly task. When the user verifies the first pre-task position of the robot 102, the robot manager 100 calculates a first actual pre-task pose. After calculating the first actual pre-task pose, the robot manager 100 instructs the robot 102 to perform the first assembly task. When the robot 102 reaches an actual post-task position after performing the first assembly task, the robot manager 100 calculates a first actual post-task pose. The robot manager 100 calculates a localization offset by comparing at least one of (1) the first actual pre-task pose to a first estimated pre-task pose or (2) the first actual post-task pose to a first estimated post-task pose, where the first estimated pre-task pose and the first estimated post-task pose are based on the model(s) 118.

In operation, the robot 102 performs the rest of the workflow using the localization offset, as determined by the robot manager 100, without user or other third-party assistance or intervention. For example, the robot 102 may perform a second assembly task, a third assembly task, etc., by using the localization offset. For example, the robot manager 100 may direct the robot 102 to move along a second trajectory from the home position to a second staging position to a second estimated pre-task position which, in turn, causes the robot 102 to move to a second actual pre-task position different from the second estimated pre-task position. In such examples, the robot manager 100 calculates a third trajectory to be appended to the second trajectory based on the localization offset. For example, after the robot 102 completes the second trajectory, the robot manager 100 may instruct the robot 102 to move along the third trajectory from the second actual pre-task position to a third estimated pre-task position which, in turn, causes the robot 102 to move to a third actual pre-task position, where the difference between the second and third actual pre-task position corresponds to the localization offset. When the robot 102 moves to the third actual pre-task position, the robot 102 performs the second assembly task. The robot 102 performs additional assembly tasks in the workflow in a similar manner. In some examples, the robot manager 100 updates the model(s) 118 based on the localization offset. For example, the robot manager 100 may update the model(s) 118 to adjust poses associated with unprocessed or yet to be processed assembly tasks such as the third assembly task, a fourth assembly task, etc.

In some examples, the robot 102 travels and/or otherwise navigates to the assembly position and performs the assembly task. In other examples, the robot 102 is unable to perform the assembly task based on an uncertainty of localization satisfying a threshold (e.g., a localization uncertainty threshold). A localization uncertainty may correspond to an output of one or more probabilistic functions that determine whether the robot 102 is unable to perform an assembly task based on a position uncertainty at one or more waypoints along a robot trajectory. A position uncertainty may refer to a probabilistic correlation of an estimated pose and an actual pose determined in part or in whole by a measurement of the sensor 112, verified joint states of the robot 102, etc. For example, the robot 102 may determine that performing the assembly task at the assembly position will generate a collision that can damage the robot 102, the collar 114, the bolt 116, etc., based on determining the localization uncertainty. In other examples, the robot 102 is unable to perform the assembly task due to colliding the end effector 108 with the bolt 116, the assembly 104, etc. In some examples, in response to the localization uncertainty satisfying the threshold, the robot manager 100 calculates and/or otherwise determines the localization offset (e.g., a localization adjustment, a correction factor, etc.).

Figure 2:
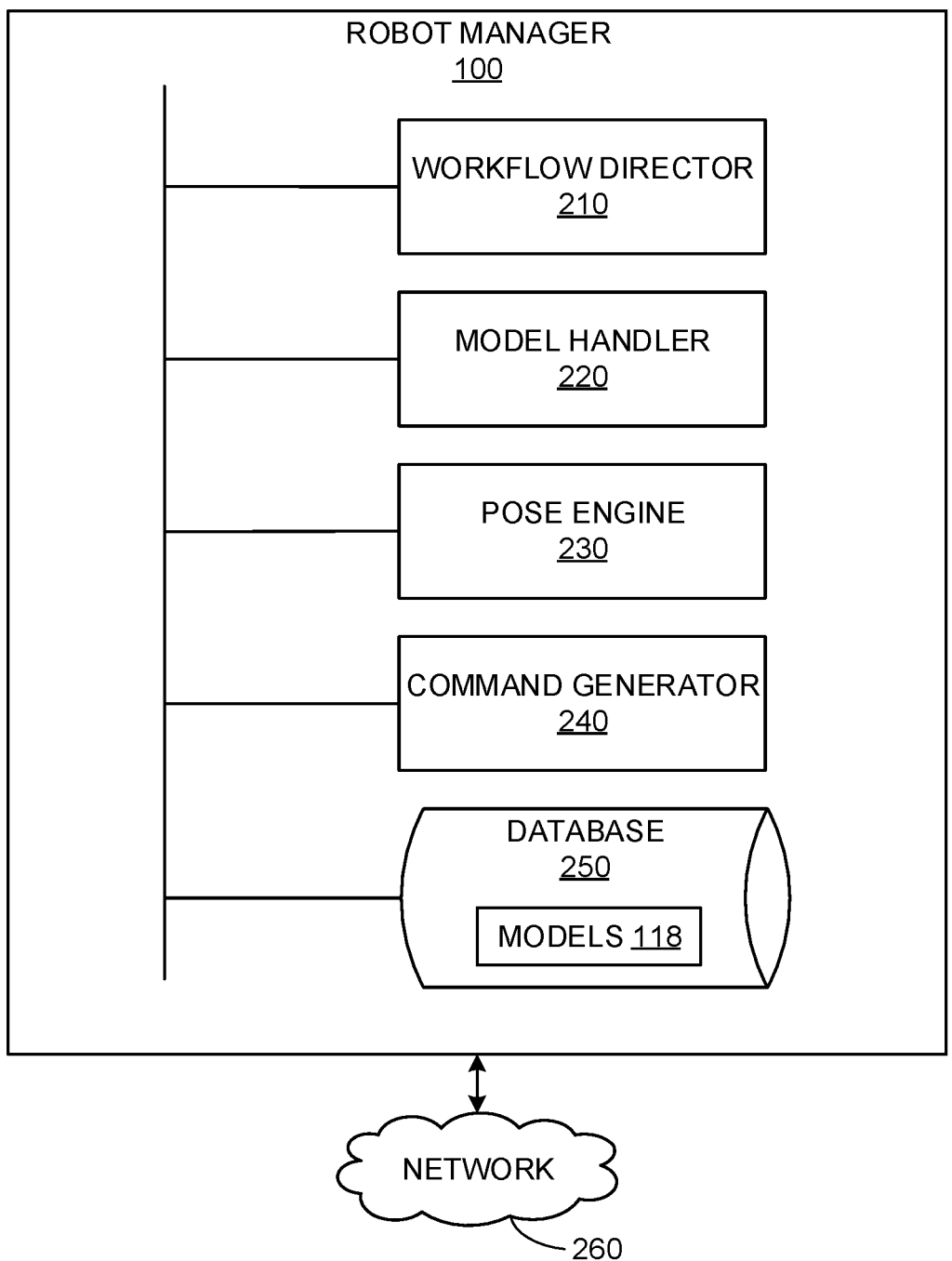
FIG. 2 is a block diagram of an example implementation of the example robot manager of FIGS. 1A and 1B.

FIG. 2 is a block diagram of an example implementation of the robot manager 100 of FIGS. 1A and 1B. The robot manager 100 facilitates operation of the robot 102 of FIGS. 1A-1B when performing an assembly task. The robot manager 100 generates commands and transmits the commands to the robot 102 to direct the robot 102 to one or more positions based on a trajectory including joint states, waypoints, etc., determined from the model(s) 118. In some examples, the robot manager 100 determines a correction factor when a user guides the robot 102 to a verified actual pre-task position. In other examples, the robot manager 100 determines the correction factor when a localization uncertainty associated with an assembly task satisfies a threshold. The robot manager 100 updates the model(s) 118 (as described below in connection with the model handler 220) based on the correction factor to facilitate operation of subsequent assembly tasks. In the illustrated example of FIG. 2, the robot manager 100 includes an example workflow director 210, an example model handler 220, an example pose engine 230, an example command generator 240, and an example database 250.

In the illustrated example of FIG. 2, the robot manager 100 includes the workflow director 210 to obtain a workflow including one or more assembly tasks to be performed by the robot 102. In some examples, the workflow director 210 obtains the workflow from an example network 260. The network 260 of the illustrated example of FIG. 2 is the Internet. However, the network 260 can be implemented using any suitable wired and/or wireless network(s) including, for example, one or more data buses, one or more Local Area Networks (LANs), one or more wireless LANs, one or more process control networks, one or more cellular networks, one or more private networks, one or more public networks, etc. In some examples, the network 260 enables the robot manager 100 to be in communication with an external computing device (e.g., a database, a server, etc.) coupled to the network 260.

In some examples, the workflow director 210 includes means to import the model(s) 118 associated with the workflow. For example, the workflow director 210 may obtain a first CAD model associated with the robot 102, a second CAD model associated with the assembly 104, a third CAD model associated with an environment of the robot 102 and/or the assembly 104, etc. The workflow director 210 may synthesize and/or otherwise combine two or more of the models 118 into a single model.

In some examples, the workflow director 210 includes means to determine an order or sequence of operations associated with the workflow. For example, the workflow director 210 may determine a sequence including a first assembly task associated with coupling the first one of the collars 114 to the first one of the bolts 116 of FIGS. 1A-1B followed by a second assembly task associated with coupling the second one of the collars 114 to the second one of the bolts 116. In other examples, the workflow director 210 may determine that there are no additional assembly tasks to be performed by the robot 102.

In the illustrated example of FIG. 2, the robot manager 100 includes the model handler 220 to coordinate and/or otherwise facilitate movement of the robot 102 based on the model(s) 118. In some examples, the model handler 220 determines assembly positions such as estimated pre-task positions, estimated post-task positions, etc., based on the model(s) 118. For example, the model handler 220 may determine coordinates associated with an estimated pre-task position in the modeling environment (e.g., the model space, the CAD environment, etc.). In other examples, the model handler 220 may determine coordinates associated with a home position of the robot 102, one or more staging positions, one or more of the collars 114, one or more of the bolts 116, etc., or a position of any other component or object associated with the robot 102 and/or the assembly 104 of FIGS. 1A-1B.

In some examples, the model handler 220 includes means to determine a trajectory (e.g., a robot trajectory) associated with an assembly task. For example, the model handler 220 may identify one or more joint states, waypoints, etc., included in a trajectory that can be used to move the robot 102 from the home position, a staging position, etc., to a pre-task position. In some examples, the robot 102 can satisfy proper manipulation of an assembly item (e.g., the collars 114) via more than one trajectory. For example, the model handler 220 may select a first assembly task to process that includes manipulating a first assembly item (e.g., the first one of the collars 114). In response to selecting the first assembly task, the model handler 220 may generate a set of trajectories including one or more trajectories associated with the first assembly task.

In some examples, the model handler 220 includes means to identify a trajectory from the set of generated trajectories to perform the first assembly task by determining that the identified trajectory has a goal state proximate to a post-task state of a previously processed assembly item. For example, the model handler 220 may identify the trajectory by determining that a pose of the robot 102 at a post-task position of an immediately preceding assembly task can produce more trustworthy trajectories than using poses of the robot 102 from several preceding tasks ago. In some examples, a goal state refers to a state of the assembly item with a desired property such as a desired position, a desired torque value when installed, etc. For example, the goal state of one of the collars 114 may correspond to being coupled to one of the bolts 116 at a desired position and/or a desired torque. For example, the desired position may be based on the position of the bolt 116 in the model(s) 118. In response to identifying the trajectory, the model handler 220 generates joint states associated with the trajectory. For example, each of the joint states may correspond to a waypoint, a property of the robot 102 at the waypoint, etc.

In some examples, the model handler 220 includes means to determine estimated robot poses based on a ground truth, where the ground truth corresponds to the most accurate measurement available to the robot 102. The model handler 220 may use the model(s) 118 as the ground truth for determining the estimated robot poses (e.g., the estimated pre-task poses, the estimated post-task poses, etc.). The model handler 220 may determine the estimated robot poses by calculating coordinates in the model(s) 118 via simulations of moving the robot 102 using trajectories. For example, the model handler 220 may simulate moving the robot 102 from the home position to an estimated pre-task position associated with the first one of the bolts 116 using a trajectory. The model handler 220 may identify coordinates of the home position, the estimated pre-task position, etc., by determining the coordinates of the robot 102 as the robot 102 moves along the trajectory in the simulation. As a result, the model handler 220 may determine the estimated poses of the end effector 108 and/or the robot 102 by identifying coordinates of the end effector 108 and/or the robot 102 when simulating the trajectory by using the model(s) 118 as the ground truth.

In some examples, the model handler 220 includes means to update the model(s) 118 based on a correction factor. For example, the model handler 220 may update the model(s) 118 by generating a set of trajectories using the correction factor that can be appended to trajectories associated with performing the assembly tasks in the workflow. For example, the model handler 220 may generate a first set of trajectories including a first trajectory that the robot 102 is to use to move from the home position to the first staging position, to the first estimated pre-task position, etc., during a first assembly task which, in turn, may cause the robot 102 to move to the first actual pre-task position. The model handler 220 may generate a second set of trajectories including a second trajectory that the robot 102 is to use to move from the first actual pre-task position to the second actual pre-task position, where the difference in motion from the first to the second actual pre-task position is based on the correction factor. For example, the robot 102 may use the second set of trajectories to append to the first set of trajectories when performing the assembly tasks in the workflow. In other examples, the model handler 220 generates a third set of trajectories that combines or synthesizes the first set of trajectories and the second set of trajectories, where the third set of trajectories replaces the first set of trajectories and the second set of trajectories.

In some examples, the model handler 220 includes means to determine the actual pose of the robot 102 when the robot 102 moves to an estimated pre-task position. For example, the model handler 220 may determine the actual pre-task pose of the robot 102 by determining a change in rotation, translation, etc., of the end effector 108 from the home pose or a staging pose by applying measurements from the sensor 112 to the home pose or the staging pose. The model handler 220 may determine the actual pre-task pose by calculating one or more rotation quaternions, one or more translation quaternions, etc., and/or a combination thereof by applying the measurements to the home pose, the staging pose, etc.

In some examples, the robot manager 100 determines the actual pose of the robot 102 when the assembly task is (successfully) completed (e.g., the robot 102 is at the post-task position). For example, the robot manager 100 may determine the actual post-task pose of the robot 102 when the robot 102 has begun coupling the first one of the collars 114 to the first one of the bolts 116 at the pre-task position and moves to the post-task position after completing the coupling. In such examples, the robot manager 100 determines the actual post-task pose of the robot 102 at the actual post-task position when a torque measurement associated with the coupling satisfies a torque threshold (e.g., the first one of the collars 114 has bottomed-out on the first one of the bolts 116). The robot manager 100 may determine the actual post-task pose by applying measurements from the sensor 112 to the home pose, the staging pose, etc., to generate one or more rotation quaternions, one or more translation quaternions, etc., and/or a combination thereof.

In the illustrated example of FIG. 2, the robot manager 100 includes the pose engine 230 to determine a correction factor or a localization offset to facilitate performance of an assembly task by the robot 102. In some examples, the pose engine 230 determines the correction factor after the user moves the robot 102 to a verified actual pre-task position, a verified actual post-task position, etc. In some examples, the pose engine 230 determines the correction factor based on whether an assembly task has been completed. For example, the pose engine 230 may determine that the uncertainty of localization associated with the end effector 108 satisfies the localization uncertainty threshold. In other examples, the pose engine 230 may determine that the uncertainty of localization associated with the end effector 108 does not satisfy the localization uncertainty threshold. In such examples, the pose engine 230 may determine that the assembly task has been successfully performed when a torque value associated with the end effector 108 and the collar 114 satisfies a manipulation threshold (e.g., a torque threshold). For example, the pose engine 230 may determine that the collar 114 has bottomed-out on the bolt 116 when the torque value is greater than the torque threshold and, thus, the torque value satisfies the torque threshold.

In some examples, the pose engine 230 includes means to determine whether the localization uncertainty satisfies the localization uncertainty threshold. For example, the pose engine 230 may determine a first joint state of the robot 102 corresponding to a first staging position and determine a second joint state of the robot 102 at a pre-task position. In some examples, the pose engine 230 determines that the correlation between the uncertainty of the first joint state and the second joint state satisfies the localization uncertainty threshold. For example, the correlation between the uncertainty of two joint states may increase as a function of the distance between the two joint states in Euclidean space. In such examples, the pose engine 230 may determine that the reliability of position information associated with (subsequent) joint states increases with similarity to position information associated with a current or given joint state of the robot 102.

In some examples, the pose engine 230 includes means to determine if a correction factor has been determined when the assembly task has not been successfully performed. For example, the pose engine 230 may query the database 250 for the correction factor. In some examples, the pose engine 230 may determine that the correction factor has been determined based on receiving and/or otherwise obtaining the correction factor from the database 250. In other examples, the pose engine 230 may determine that the correction factor has not been determined based on receiving and/or otherwise obtaining a null value, a null index, etc., from the database 250 in response to the query.

In some examples, the pose engine 230 includes means to determine a correction factor. For example, the pose engine 230 may calculate a correction factor corresponding to a localization adjustment as described below in Equation (1):

$$\text{correction\_factor} = \text{robot\_base\_to\_actual\_pose} * \text{robot\_base\_to\_expected\_pose-inverse}() \quad \text{Equation (1)}$$

In the example of Equation (1) above, the term robot_base_to_actual_pose corresponds to a pose of the robot 102 when the robot 102 has completed the assembly task. For example, the pose engine 230 may determine robot_base_to_actual_pose when a torque value associated with manipulating one of the collars 114 of FIGS. 1A-1B satisfies a torque threshold (e.g., the torque value is greater than the torque threshold). In the example of Equation (1) above, the term robot_base_to_expected_pose corresponds to a pose of the robot 102 as determined based on the model(s) 118. For example, the term robot_base_to_expected_pose may correspond to an expected pose of the robot 102 when the robot 102 has completed the assembly task based on the model(s) 118.

In the example of Equation (1) above, the terms correction_factor, robot_base_to_actual_pose, and robot_base_to_expected_pose are matrices. In some examples, the matrices include at least one of one or more complex numbers or one or more real numbers. For example, one or more terms included in the example of Equation (1) above may correspond to a matrix representative of a quaternion including at least one of one or more complex numbers or one or more real numbers. In some examples, one or more of the terms are homogeneous matrices (e.g., homogenous transformation matrices, 4×4 homogenous transformation matrices, etc.). For example, one or more terms included in the example of Equation (1) may correspond to a matrix including one or more coordinates associated with position information of the robot 102. For example, the pose engine 230 may determine the correction factor by multiplying (1) a first homogeneous matrix associated with a first pose of the robot 102 corresponding to the term robot_base_to_actual_pose and (2) an inverse of a second homogeneous matrix associated with a second pose of the robot 102 corresponding to the term robot_base_to_expected_pose. Alternatively, the terms may be matrices of a different size and/or type.

In the illustrated example of FIG. 2, the robot manager 100 includes the command generator 240 to generate and/or otherwise determine a command, an instruction, etc., and transmit the command, the instruction, etc., to the robot 102 to control the robot 102. In some examples, the command generator 240 generates a command to perform an assembly task. For example, the command generator 240 may generate one or more commands to instruct the robot 102 to couple one of the collars 114 to one of the bolts 116. The command generator 240 may generate a first command to move the robot 102 from the home position to the staging position, a second command to obtain one of the collars 114 at the staging position, a third command to move from the staging position to the pre-task position, etc. In some examples, the command generator 240 generates the command based on the estimated pre-task position generated using the ground truth of the model(s) 118.

In some examples, the command generator 240 includes means to control the robot 102 to perform an assembly task using a correction factor. For example, the command generator 240 may transmit a first command to one or more processors controlling the robot 102 to move the robot 102 to a first estimated pre-task position which, in turn, moves the robot 102 to a first actual pre-task position. In some examples, the command generator 240 may transmit a second command to the one or more processors controlling the robot 102 to move the robot 102 to a second actual pre-task position, where the difference between the first actual pre-task position and the second actual pre-task position is determined by the correction factor. In other examples, the pose engine 230 uses the correction factor based on determining that an uncertainty of localization associated with the assembly position satisfies a localization uncertainty threshold. In response to the localization uncertainty satisfying the localization uncertainty threshold, the command generator 240 may generate the second command to perform the assembly task.

In some examples, the command generator 240 includes means to control the robot 102 using an assist-based system when the uncertainty of localization associated with the assembly position satisfies a localization uncertainty threshold. For example, the command generator 240 may direct the robot 102 to enter and/or otherwise transition to an assist mode. For example, the robot 102 may enter the assist mode when the robot 102 moves to a position proximate the assembly position based on the trajectory but the difference between the proximate position and the assembly position generates a localization uncertainty that satisfies the localization uncertainty threshold.

In some examples when in the assist mode, a user may adjust a pose of the robot 102 from the proximate position to the assembly position. In other examples when in the assist mode, the command generator 240 may instruct the robot 102 to move from the proximate position to the assembly position based on an output from a sensor such as a camera-based system, an encoder, etc., or any other type of sensor. For example, the camera-based system may identify a difference (e.g., a position difference) between the proximate position and the assembly position. The command generator 240 may generate a command to move the robot 102 to the assembly position based on the difference.

In some examples, the command generator 240 includes means to manipulate an assembly item at an assembly location. For example, the command generator 240 may generate a command to direct the robot 102 to couple the collar 114 to the bolt 116 at the assembly location using the end effector 108. The command generator 240 may stop manipulating the assembly item at the assembly location when a sensor measurement satisfies a threshold. For example, the command generator 240 may obtain a torque measurement from the sensor 112, compare the torque measurement to a torque threshold, and generate a command to stop the end effector 108 from coupling the collar 114 to the bolt 116 when the torque measurement is greater than the torque threshold. When the sensor measurement is greater than the threshold (e.g., the sensor measurement satisfies the threshold), the command generator 240 may direct the pose engine 230 to determine a pose of the robot 102 that corresponds to the actual robot pose.

In the illustrated example of FIG. 2, the robot manager 100 includes the database 250 to record and/or otherwise store data. The database 250 of FIG. 2 includes the model(s) 118 of FIGS. 1A and 1B. In some examples, the database 250 records and/or otherwise stores one or more of the models 118 associated with the robot 102, a sequence of one or more assembly tasks, one or more trajectories, measurements from the sensor 112, one or more threshold values, one or more correction factors, one or more poses, etc. The database 250 can be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 250 can additionally or alternatively be implemented by one or more double data rate (DDR) memories, such as DDR, DDR2, DDR3, mobile DDR (mDDR), etc. The database 250 can additionally or alternatively be implemented by one or more mass storage devices such as hard disk drive(s), compact disk drive(s) digital versatile disk drive(s), etc.

While in the illustrated example of FIG. 2 the database 250 is illustrated as a single database, the database 250 can be implemented by any number and/or type(s) of databases. Furthermore, the data stored in the database 250 can be in any data format such as, for example, binary data, comma delimited data, model data (e.g., CAD data), tab delimited data, structured query language (SQL) structures, etc. In some examples, the database 250 can be cloud-based to enable synchronous retrieving and updating with one or more computing devices communicatively coupled to the robot manager 100 via the network 260.

While an example manner of implementing the robot manager 100 of FIGS. 1A-1B is illustrated in FIG. 2, one or more of the elements, processes, and/or devices illustrated in FIG. 2 may be combined, divided, re-arranged, omitted, eliminated, and/or implemented in any other way. Further, the example workflow director 210, the example model handler 220, the example pose engine 230, the example command generator 240, the example database 250, and/or, more generally, the example robot manager 100 of FIGS. 1A-1B may be implemented by hardware, software, firmware, and/or any combination of hardware, software, and/or firmware. Thus, for example, any of the example workflow director 210, the example model handler 220, the example pose engine 230, the example command generator 240, the example database 250, and/or, more generally, the example robot manager 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example workflow director 210, the example model handler 220, the example pose engine 230, the example command generator 240, and/or the example database 250 is/are hereby expressly defined to include a non-transitory computer readable storage device or storage disk such as a memory, a digital versatile disk (DVD), a compact disk (CD), a Blu-ray disk, etc., including the software and/or firmware. Further still, the example robot manager 100 of FIGS. 1A-1B may include one or more elements, processes, and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
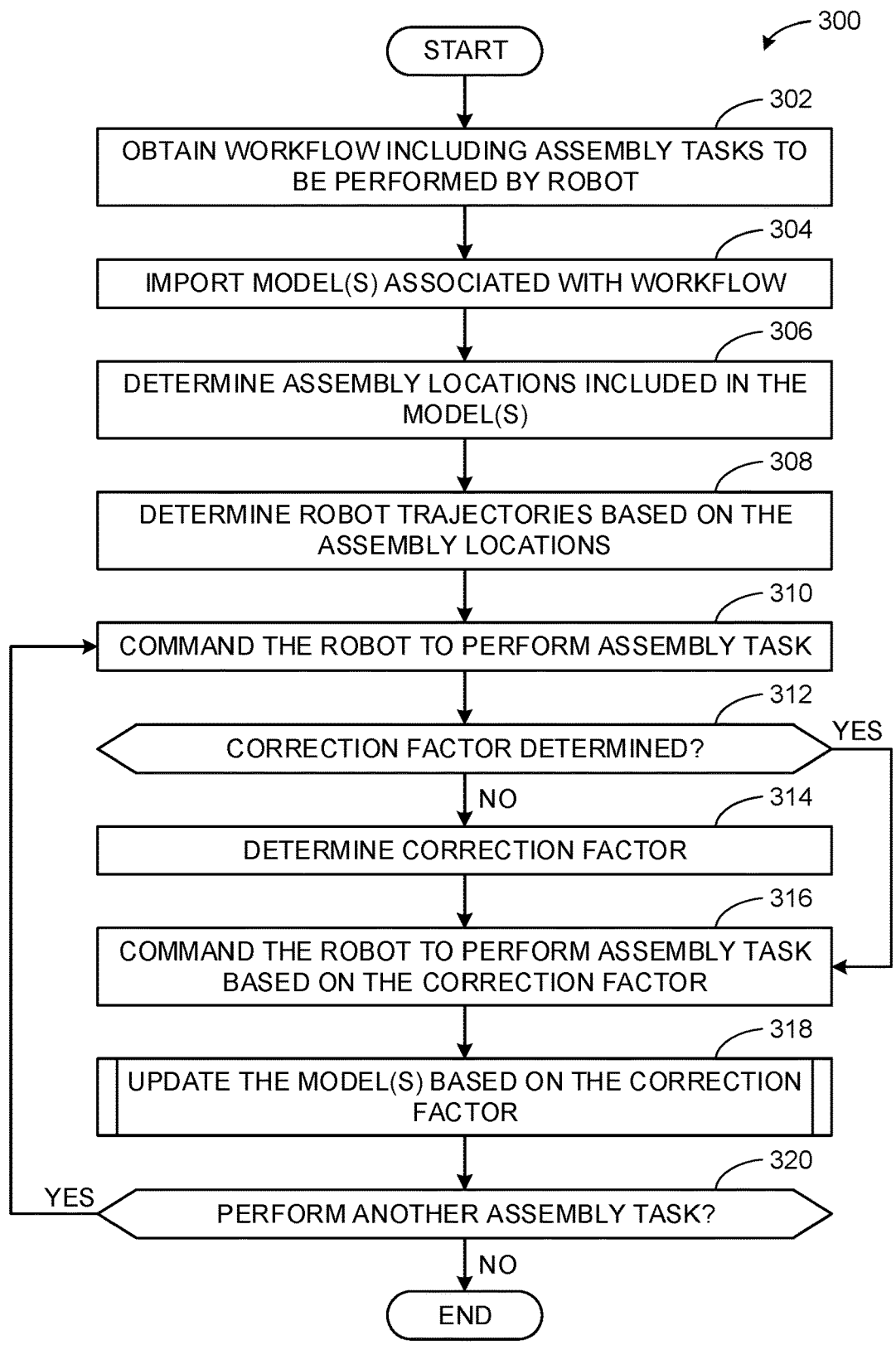
FIG. 3 is a flowchart representative of example machine readable instructions that may be executed to implement the example robot manager of FIGS. 1A-2 to perform an assembly task using the example robot of FIGS. 1A-1B.
Figure 4:
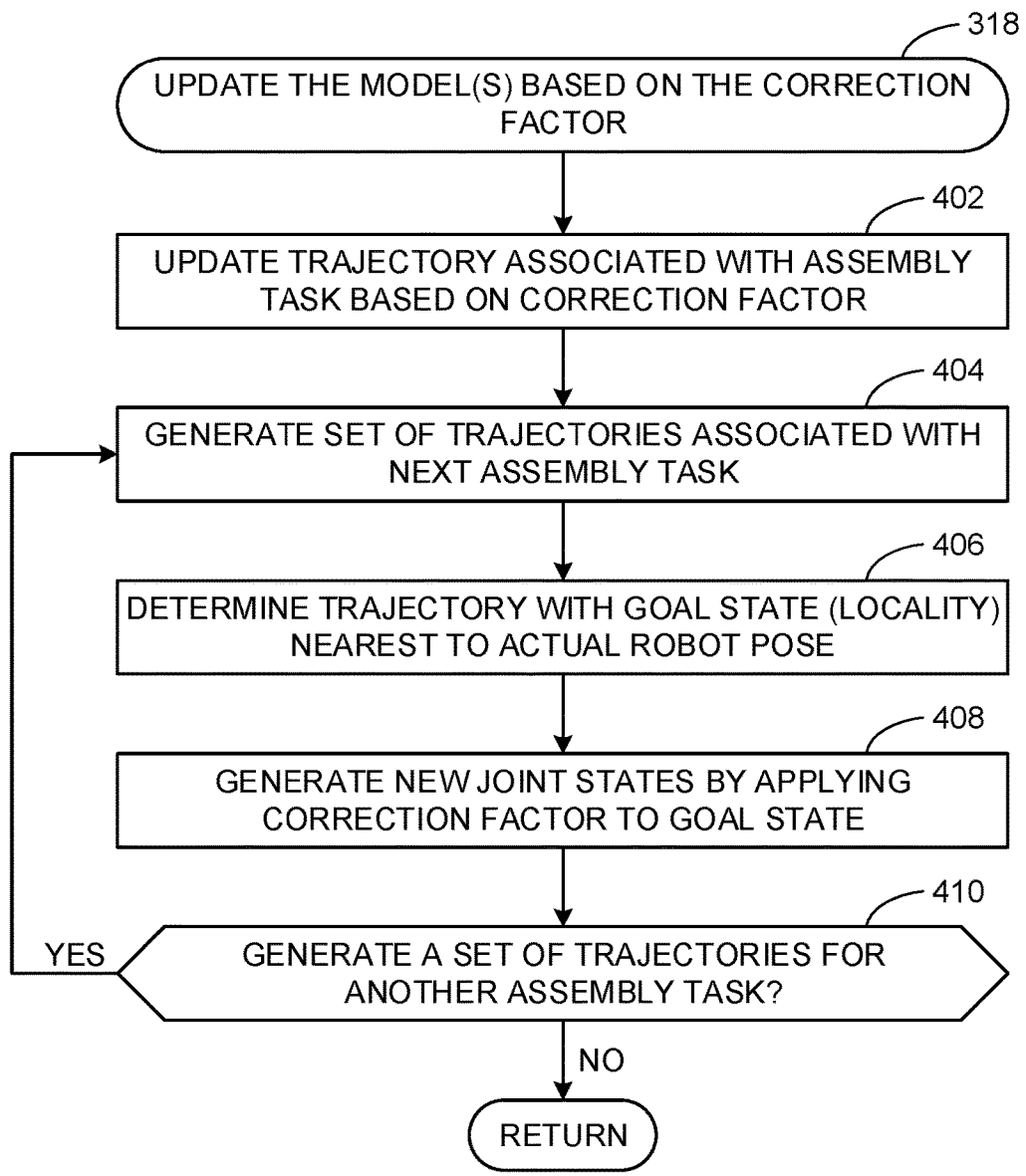
FIG. 4 is a flowchart representative of example machine readable instructions that may be used by the example robot manager of FIGS. 1A-2 to update a model based on a correction factor.
Figure 5:
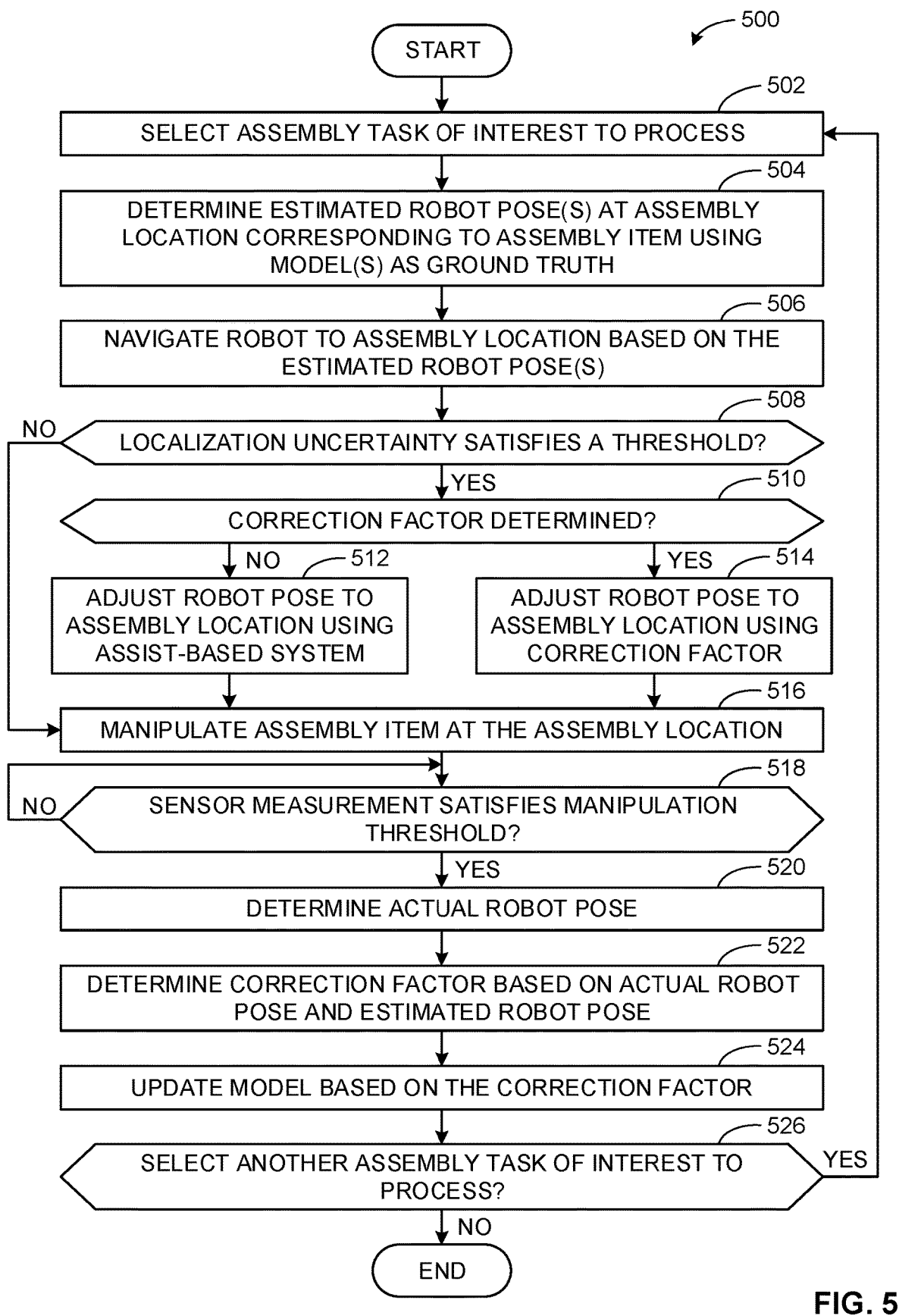
FIG. 5 is another flowchart representative of example machine readable instructions that may be executed to implement the example robot manager of FIGS. 1A-2 to perform an assembly task using the example robot of FIGS. 1A-1B.

Flowcharts representative of example hardware logic, machine readable instructions, hardware implemented state machines, and/or any combination thereof for implementing the robot manager 100 of FIGS. 1A-2 is shown in FIGS. 3-5. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3-5, many other methods of implementing the example robot manager 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3-5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 3 is a flowchart representative of example machine readable instructions 300 that may be executed to implement the robot manager 100 of FIGS. 1A-2 to perform an assembly task. The machine readable instructions 300 begin at block 302, at which the robot manager 100 obtains a workflow including assembly tasks to be performed by a robot. For example, the workflow director 210 (FIG. 2) may obtain a workflow including performing one or more assembly tasks on the assembly 104 of FIGS. 1A-1B.

At block 304, the robot manager 100 imports model(s) associated with the workflow. For example, the workflow director 210 may import one or more of the models 118 of FIGS. 1A-2 associated with the robot 102 of FIGS. 1A-1B, the assembly 104 of FIGS. 1A-1B, etc.

At block 306, the robot manager 100 determines assembly locations included in the model(s). For example, the model handler 220 (FIG. 2) may determine a first estimated pre-task position associated with a first one of the bolts 116, a second estimated pre-task position associated with a second one of the bolts 116, etc., that are coupled to the assembly 104 based on the model(s) 118.

At block 308, the robot manager 100 determines robot trajectories based on the assembly locations. For example, the model handler 220 may determine a trajectory associated with the first estimated pre-task position. The model handler 220 may determine a first joint state associated with the robot 102 in a first staging position to obtain one of the collars 114, a second joint state associated with the robot 102 at the first estimated pre-task position, etc., and/or any other joint states associated with one or more other positions or waypoints included in the trajectory.

At block 310, the robot manager 100 commands the robot to perform an assembly task. For example, the command generator 240 (FIG. 2) may instruct the robot 102 to move from the first staging position to the first estimated pre-task position to couple one of the collars 114 of FIGS. 1A-1B to one of the bolts 116 of FIGS. 1A-1B. In response to the instruction, the robot 102 moves to a first actual pre-task position, which is different from the first estimated pre-task position.

At block 312, the robot manager 100 determines whether a correction factor has been determined. For example, the pose engine 230 (FIG. 2) may query the database 250 (FIG. 2) to determine whether a correction factor has been calculated. In such examples, the pose engine 230 may retrieve and/or otherwise obtain the correction factor from the database 250 in response to the query. In other examples, the pose engine 230 may determine that the correction factor has not been determined based on retrieving and/or otherwise obtaining a null value from the database 250 in response to the query.

If, at block 312, the robot manager 100 determines that the correction factor has been determined, control proceeds to block 316 to command the robot to perform the assembly task using the correction factor. If, at block 312, the robot manager 100 determines that the correction factor has not been determined, then, at block 314, the robot manager 100 determines the correction factor. For example, the pose engine 230 may direct the robot 102 to enter into the assist mode. A user may move the robot 102 into a correct or verified pre-task position. The pose engine 230 may determine a first actual pre-task pose of the robot 102 when the user verifies that the robot 102 moved into the correct position to perform the first assembly task. The pose engine 230 may determine a correction factor based on a comparison of the first actual pre-task pose of the robot 102 to the first estimated pre-task pose of the robot 102. In other examples, the pose engine 230 may invoke the command generator 240 to move the robot 102 to the correct or the verified position based on an output from a camera system or any other type of secondary sensor-based system.

In response to determining the correction factor at block 314, the robot manager 100 commands the robot to perform the assembly task based on the correction factor at block 316. For example, the command generator 240 may generate and transmit a command to direct the robot 102 to couple the collar 114 to the bolt 116 at the first pre-task position based on an appended trajectory to the first trajectory as determined by the model handler 220 using the correction factor.

At block 318, the robot manager 100 updates the model(s) based on the correction factor. For example, the model handler 220 may update one or more of the model(s) 118 by generating a set of trajectories to be appended to the trajectories generated at block 308 based on the correction factor. In other examples, the model handler 220 may update one or more of the model(s) 118 by generating a set of trajectories that synthesizes and/or otherwise combines the trajectories generated at block 308 with the appended trajectories. An example process that may be used to implement block 318 is described below in connection with FIG. 4.

At block 320, the robot manager 100 determines whether to perform another assembly task. For example, the workflow director 210 may determine that there is another assembly task to process. In other examples, the workflow director 210 may determine that the workflow has been completed and there are no additional assembly tasks to process. If, at block 320, the robot manager 100 determines to perform another task, control returns to block 310 to command the robot to perform another assembly task. If, at block 320, the robot manager 100 determines not to perform another task then the machine readable instructions 300 of FIG. 3 conclude.

FIG. 4 is a flowchart representative of example machine readable instructions 400 that may be used by the example robot manager 100 of FIGS. 1A-2 to update a model based on a correction factor. The example process of FIG. 4 may be used to implement the operation of block 318 of FIG. 3.

The machine readable instructions 318 begin at block 402, at which the robot manager 100 updates the trajectory associated with the assembly task based on the correction factor. For example, the model handler 220 (FIG. 2) may update the trajectory associated with the first assembly task based on the correction factor. In such examples, the model handler 220 may generate a new trajectory to append to the current trajectory to move the robot 102 from the first actual pre-task position to the second actual pre-task position.

At block 404, the robot manager 100 generates a set of trajectories associated with a next assembly task. For example, the model handler 220 may generate a set of one or more trajectories associated with coupling a second one of the collars 114 of FIGS. 1A-1B to a second one of the bolts 116 of FIGS. 1A-1B. The set of one or more trajectories may correspond to potential appending trajectories to be used by the command generator 240 (FIG. 2) to correct the trajectory to be used to perform a second assembly task, where the correction is to enable the robot 102 to perform the second assembly task without user intervention or input from a secondary sensor system.

At block 406, the robot manager 100 determines a trajectory with a goal state (locality) nearest to actual robot pose. For example, the model handler 220 may select one of the trajectories in the set based on a goal state associated with the selected trajectory being closest to an actual pre-task pose, an actual post-task pose, etc., of the robot 102 when performing the first assembly task.

At block 408, the robot manager 100 generates new joint states by applying the correction factor to the goal state. For example, the model handler 220 may generate a third joint state associated with the robot 102 moving from a second actual pre-task position to a third actual pre-task position, a fourth joint state associated with the robot 102 moving from the third actual pre-task position to a second actual post-task position, etc.

At block 410, the robot manager 100 determines whether to generate a set of trajectories for another assembly task. For example, the model handler 220 may determine to generate a set of trajectories for a third assembly task. In other examples, the model handler 220 may determine to generate a set of trajectories for each of the assembly tasks included in the workflow to determine new joint states based on the correction factor. In yet other examples, the model handler 220 may determine not to generate a set of trajectories for another assembly task.

If, at block, 410, the robot manager 100 determines to generate a set of trajectories for another assembly task, control returns to block 404 to generate a set of trajectories associated with a next or subsequent assembly task. If, at block, 410, the robot manager 100 determines not to generate a set of trajectories for another assembly task, the machine readable instructions 318 of FIG. 4 return to block 320 of the example of FIG. 3 to determine whether to perform another assembly task.

FIG. 5 is another flowchart representative of example machine readable instructions 500 that may be executed to implement the robot manager 100 of FIGS. 1A-2 to perform an assembly task. The machine readable instructions begin at block 502, at which the robot manager 100 selects an assembly task of interest to process. For example, the workflow director 210 (FIG. 2) may select an assembly task including coupling a first one of the collars 114 to a first one of the bolts 116 of FIGS. 1A-1B to process.

At block 504, the robot manager 100 determines estimated robot pose(s) at an assembly location corresponding to an assembly item using model(s) as a ground truth. For example, the model handler 220 (FIG. 2) may determine coordinates of a first one of the collars 114, a first one of the bolts 116 on the assembly 104 of FIGS. 1A-1B, etc., based on the model(s) 118. The model handler 220 may determine a trajectory including a first joint state of the robot 102 at a first position (e.g., the home position, the first staging position, etc.), a second joint state associated with the robot 102 at a second position (e.g., a pre-task position associated with the first one of the bolts 116), etc., and/or any other joint states associated with one or more other positions or waypoints along the trajectory. The model handler 220 may determine coordinates associated with a pose of the robot 102 at the second position based on the trajectory and identify the pose as the first estimated pre-task pose.

At block 506, the robot manager 100 navigates the robot to the assembly location based on the estimated robot pose(s). For example, the command generator 240 (FIG. 2) may generate a command and transmit the command to the robot 102 to move the robot 102 from the first position to the second position to reach the first estimated pre-task pose which, in turn, moves the robot 102 to a first actual pre-task position.

At block 508, the robot manager 100 determines whether a localization uncertainty satisfies a threshold. For example, the pose engine 230 (FIG. 2) may determine that the localization uncertainty associated with the correlation of the first joint state and the second joint state of the robot 102 satisfies the localization uncertainty threshold.

If, at block 508, the robot manager 100 determines that the localization uncertainty does not satisfy the threshold, control proceeds to block 516 to manipulate the assembly item at the assembly location. If, at block 508, the robot manager 100 determines that the localization uncertainty satisfies the threshold, then, at block 510, the robot manager 100 determines whether a correction factor has been determined. For example, the pose engine 230 may query the database 250 (FIG. 2) to determine whether a correction factor has been calculated. In such examples, the pose engine 230 may retrieve and/or otherwise obtain the correction factor from the database 250 in response to the query. In other examples, the pose engine 230 may determine that the correction factor has not been determined based on retrieving and/or otherwise obtaining a null value from the database 250 in response to the query.

If, at block 510, the robot manager 100 determines that the correction factor has been determined, control proceeds to block 514 to adjust the robot pose to the assembly location using the correction factor. If, at block 510, the robot manager 100 determines that the correction factor has not been determined, then, at block 512, the robot manager 100 adjusts the robot pose to the assembly location using an assist-based system. For example, the pose engine 230 may instruct the robot 102 to enter the assist mode. A user may move the robot 102 into the correct position to perform the first assembly task. In other examples, the pose engine 230 may invoke the command generator 240 to move the robot 102 into the correct position using a camera-based system or any other sensor-based system when such systems are available to the robot 102.

In response to either adjusting the robot pose to the assembly location using the assist-based system at block 512 or adjusting the robot pose to the assembly location using the correction factor at block 512, the robot manager 100 manipulates the assembly item at the assembly location at block 516. For example, the command generator 240 may generate and transmit a command to the robot 102 to direct the robot 102 to couple the collar 114 to the bolt 116 at the second position.

At block 518, the robot manager 100 determines whether a sensor measurement satisfies a manipulation threshold. For example, the command generator 240 may obtain a torque measurement from the sensor 112 of FIGS. 1A-1B, compare the torque measurement to a torque threshold, and generate a command to stop the coupling of the collar 114 and the bolt 116 when the torque measurement is greater than the torque threshold.

If, at block 518, the robot manager 100 determines that the sensor measurement does not satisfy the manipulation threshold, control waits at block 518 for the robot 102 to complete the coupling. If, at block 518, the robot manager 100 determines that the sensor measurement satisfies the manipulation threshold, then, at block 520, the robot manager 100 determines the actual robot pose. For example, when the torque measurement satisfies the torque threshold, the command generator 240 may invoke the pose engine 230 to determine a pose of the robot 102 that corresponds to the first actual post-task pose of the robot 102.

At block 522, the robot manager 100 determines a correction factor based on the actual robot pose and the estimated robot pose. For example, the pose engine 230 may determine and/or otherwise calculate a localization adjustment by using the example of Equation (1) above based on the first actual pre-task pose, the first actual post-task pose, the first estimated pre-task pose, the first estimated post-task pose, etc.

At block 524, the robot manager 100 updates the model based on the correction factor. For example, the model handler 220 may update the model(s) 118 based on the correction factor by using the process of FIG. 4. In some examples, the model handler 220 updates the model(s) 118 by updating information associated with one or more subsequent assembly tasks. For example, the model handler 220 may update the model(s) 118 to generate a set of trajectories to be appended and/or otherwise applied to trajectories used to perform the assembly tasks.

At block 526, the robot manager 100 determines whether to select another assembly task of interest to process. For example, the workflow director 210 may determine to perform another assembly task including coupling a second one of the collars 114 to a second one of the bolts 116 at a second assembly location. In other examples, the workflow director 210 may determine that there is not another assembly task of interest to process. If, at block 526, the robot manager 100 determines to select another assembly task of interest to process, control returns to block 502 to select another assembly task of interest to process, otherwise the machine readable instructions 500 of FIG. 5 conclude.

Figure 6:
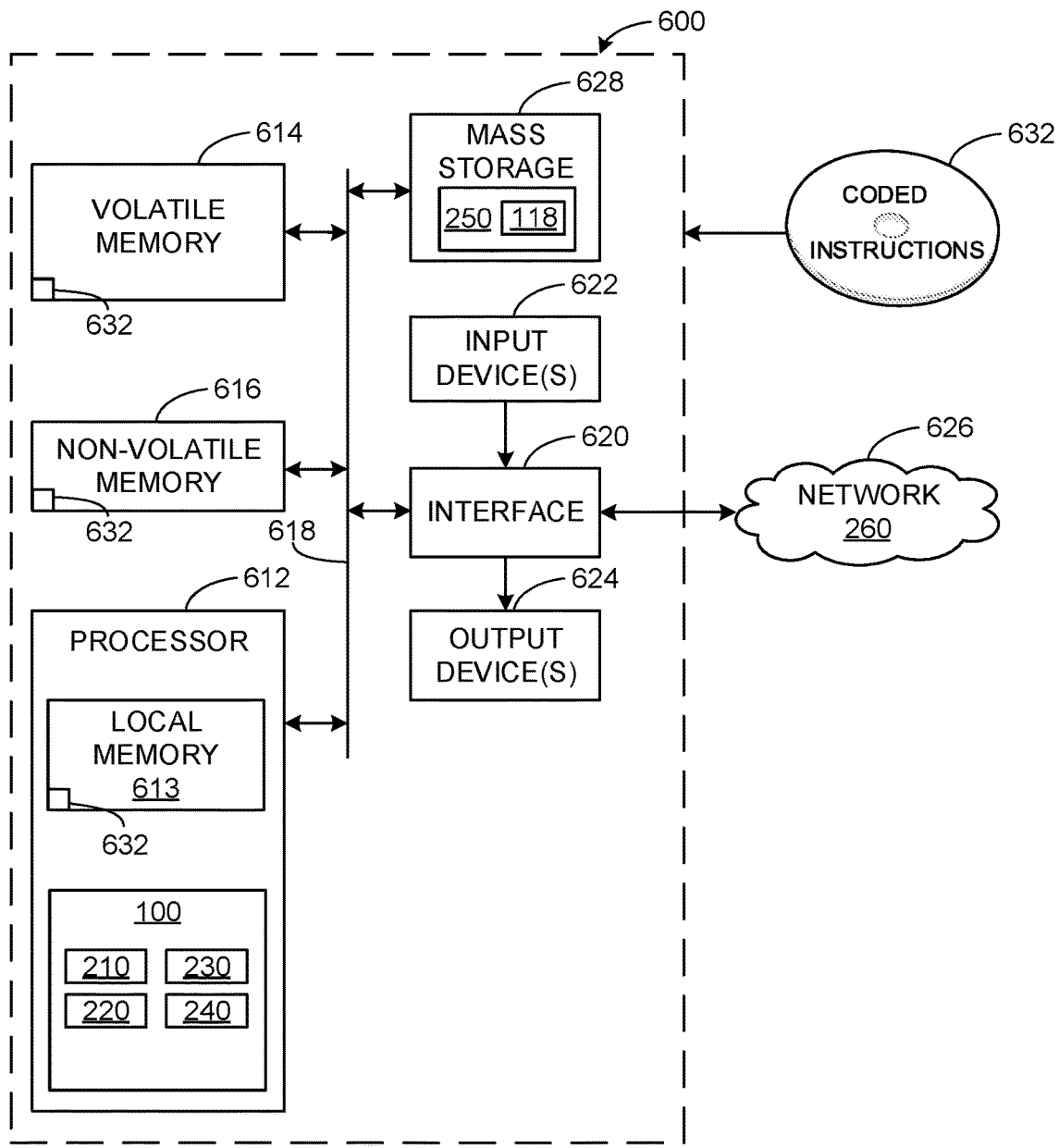
FIG. 6 is a block diagram of an example processing platform structured to execute the example machine readable instructions of FIGS. 3-5 to implement the example robot manager of FIGS. 1A-2.

FIG. 6 is a block diagram of an example processor platform 600 structured to execute the instructions of FIGS. 3-5 to implement the robot manager 100 of FIGS. 1A-2. The processor platform 600 can be, for example, a server, a personal computer, a workstation, a self-learning machine (e.g., a neural network), a mobile device (e.g., a cell phone, a smart phone, a tablet such as an iPad'), a robot computing platform, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 612 implements the example workflow director 210, the example model handler 220, the example pose engine 230, the example command generator 240, and/or, more generally, the example robot manager 100 of FIGS. 1A-2.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAIVIBUS® Dynamic Random Access Memory (RDRAM®), and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 620 of the illustrated example, thus, typically includes a graphics driver card, a graphics driver chip, and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. In this example, the network 626 implements the example network 260 of FIG. 2. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives. In this example, the one or more mass storage devices 628 implements the example database 250 of FIG. 2.

The machine executable instructions 632 of FIGS. 3-5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus, and articles of manufacture have been disclosed that improve robot control. Disclosed methods, apparatus, and articles of manufacture reduce a quantity of sensors and sensor-based systems to facilitate operation of the robot by using information associated with an end effector of the robot to determine correction factors to be applied to assembly tasks performed by the robot. Sensor-based systems such as camera-based systems require increased quantities of computing and storage resources to function and disclosed methods, apparatus, and articles of manufacture reduce and/or otherwise eliminate the need for such systems. The disclosed methods, apparatus, and articles of manufacture can reduce the quantities of computing and/or storage resources needed to facilitate operation of a robot compared to prior robots. For example, the disclosed methods, apparatus, and articles of manufacture may allocate unused resources to perform additional processing tasks and, thus, improve and/or otherwise increase capabilities or functions of one or more processors associated with a robot. The disclosed methods, apparatus, and articles of manufacture are accordingly directed to one or more improvement(s) in the functioning of a computer.

The following pertain to further examples disclosed herein.

Example 1 includes an apparatus comprising a command generator to instruct a robot to move an end effector from a staging position to an estimated pre-task position to perform a first task based on a first pose of the robot, the first pose based on a model, adjust the robot to a first actual pre-task position to perform the first task when the robot is to move to a second actual pre-task position, the first actual pre-task position proximate the estimated pre-task position, and direct the robot to perform a second task based on a correction factor, the correction factor is to be determined by determining a second pose of the robot, the second pose corresponding to position information associated with the robot at a post-task position, the post-task position corresponding to position information associated with the robot after performing the first task, and calculating the correction factor based on the first pose and the second pose.

Example 2 includes the apparatus of example 1, wherein the first task includes the robot coupling a first assembly item to a second assembly item.

Example 3 includes the apparatus of example 1, wherein the first pose is a first homogeneous matrix and the second pose is a second homogeneous matrix and the correction factor is calculated by multiplying the second homogeneous matrix and an inverse of the first homogeneous matrix.

Example 4 includes the apparatus of example 3, wherein the first homogeneous matrix and the second homogeneous matrix are 4×4 homogeneous matrices.

Example 5 includes the apparatus of example 1, further including a model handler to update the model based on the correction factor by generating a set of trajectories associated with the second task, determining one of the trajectories in the set with a goal state nearest to the second pose, and generating one or more joint states associated with the one of the trajectories by applying the correction factor to the goal state.

Example 6 includes the apparatus of example 1, further including a model handler to determine the estimated pre-task position by using the model as a ground truth to determine coordinates of the estimated pre-task position.

Example 7 includes the apparatus of example 1, wherein the command generator is to adjust the robot to the first actual pre-task position by at least one of obtaining an output from a camera system or a sensor measurement from an encoder.

Example 8 includes a non-transitory computer readable storage medium comprising instructions which, when executed, cause a machine to at least instruct a robot to move an end effector from a staging position to an estimated pre-task position to perform a first task based on a first pose of the robot, the first pose based on a model, adjust the robot to a first actual pre-task position to perform the first task when the robot is to move to a second actual pre-task position, the first actual pre-task position proximate the estimated pre-task position, determine a second pose of the robot after performing the first task, the second pose corresponding to position information associated with the robot at a post-task position, the post-task position corresponding to a position of the robot after performing the first task, calculate a correction factor based on the first pose and the second pose, and direct the robot to perform a second task based on the correction factor.

Example 9 includes the non-transitory computer readable storage medium of example 8, wherein the first task includes the robot coupling a first assembly item to a second assembly item.

Example 10 includes the non-transitory computer readable storage medium of example 8, wherein the first pose is a first homogeneous matrix and the second pose is a second homogeneous matrix and further including instructions which, when executed, cause the machine to at least calculate the correction factor by multiplying the second homogeneous matrix and an inverse of the first homogeneous matrix.

Example 11 includes the non-transitory computer readable storage medium of example 10, wherein the first homogeneous matrix and the second homogeneous matrix are 4×4 homogeneous matrices.

Example 12 includes the non-transitory computer readable storage medium of example 8, further including instructions which, when executed, cause the machine to at least update the model based on the correction factor by generating a set of trajectories associated with the second task, determining one of the trajectories in the set with a goal state nearest to the second pose, and generating one or more joint states associated with the one of the trajectories by applying the correction factor to the goal state.

Example 13 includes the non-transitory computer readable storage medium of example 8, further including instructions which, when executed, cause the machine to at least determine the estimated pre-task position by using the model as a ground truth to determine coordinates of the estimated pre-task position.

Example 14 includes the non-transitory computer readable storage medium of example 8, further including instructions which, when executed, cause the machine to at least adjust the robot to the first actual pre-task position by at least one of obtaining an output from a camera system or a sensor measurement from an encoder.

Example 15 includes a method comprising instructing a robot to move an end effector from a first position to a second position to perform a first task based on a first pose of the robot, the first pose based on a model, in response to the robot moving to a third position, adjusting the robot to a fourth position to perform the first task, the fourth position proximate the second position, in response to performing the first task, determining a second pose of the robot, the second pose corresponding to position information associated with the robot at a fifth position, the fifth position corresponding to a position of the robot after performing the first task, calculating a correction factor based on the first pose and the second pose, and directing the robot to perform a second task based on the correction factor.

Example 16 includes the method of example 15, wherein the first task includes the robot coupling a first assembly item to a second assembly item.

Example 17 includes the method of example 15, wherein the first pose is a first homogeneous matrix and the second pose is a second homogeneous matrix and calculating the correction factor includes multiplying the second homogeneous matrix and an inverse of the first homogeneous matrix.

Example 18 includes the method of example 15, further including updating the model based on the correction factor, the updating including generating a set of trajectories associated with the second task, determining one of the trajectories in the set with a goal state nearest to the second pose, and generating one or more joint states associated with the one of the trajectories by applying the correction factor to the goal state.

Example 19 includes the method of example 15, wherein the second position is determined by using the model as a ground truth to determine coordinates of the second position.

Example 20 includes the method of example 15, wherein adjusting the robot to the fourth position includes at least one of obtaining an output from a camera system or a sensor measurement from an encoder.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus comprising:
    a command generator to:
        instruct a robot to move an end effector from a staging position to an estimated pre-task position to perform a first task based on a first pose of the robot, the first pose based on a model;
        adjust the robot to a first actual pre-task position to perform the first task when the robot is to move to a second actual pre-task position, the first actual pre-task position proximate the estimated pre-task position; and
        direct the robot to perform a second task based on a correction factor, the correction factor is to be determined by:
            determining a second pose of the robot, the second pose corresponding to position information associated with the robot at a post-task position, the post-task position corresponding to position information associated with the robot after performing the first task; and
            calculating the correction factor based on the first pose and the second pose.

2. The apparatus of claim 1, wherein the first task includes the robot coupling a first assembly item to a second assembly item.

3. The apparatus of claim 1, wherein the first pose is a first homogeneous matrix and the second pose is a second homogeneous matrix and the correction factor is calculated by multiplying the second homogeneous matrix and an inverse of the first homogeneous matrix.

4. The apparatus of claim 3, wherein the first homogeneous matrix and the second homogeneous matrix are 4×4 homogeneous matrices.

5. The apparatus of claim 1, further including a model handler to update the model based on the correction factor by:
    generating a set of trajectories associated with the second task;
    determining one of the trajectories in the set with a goal state nearest to the second pose; and
    generating one or more joint states associated with the one of the trajectories by applying the correction factor to the goal state.

6. The apparatus of claim 1, further including a model handler to determine the estimated pre-task position by using the model as a ground truth to determine coordinates of the estimated pre-task position.

7. The apparatus of claim 1, wherein the command generator is to adjust the robot to the first actual pre-task position by at least one of obtaining an output from a camera system or a sensor measurement from an encoder.

8. A non-transitory computer readable storage medium comprising instructions which, when executed, cause a machine to at least:
- instruct a robot to move an end effector from a staging position to an estimated pre-task position to perform a first task based on a first pose of the robot, the first pose based on a model;
- adjust the robot to a first actual pre-task position to perform the first task when the robot is to move to a second actual pre-task position, the first actual pre-task position proximate the estimated pre-task position;
- determine a second pose of the robot after performing the first task, the second pose corresponding to position information associated with the robot at a post-task position, the post-task position corresponding to a position of the robot after performing the first task;
- calculate a correction factor based on the first pose and the second pose; and
- direct the robot to perform a second task based on the correction factor.

9. The non-transitory computer readable storage medium of claim 8, wherein the first task includes the robot coupling a first assembly item to a second assembly item.

10. The non-transitory computer readable storage medium of claim 8, wherein the first pose is a first homogeneous matrix and the second pose is a second homogeneous matrix and further including instructions which, when executed, cause the machine to at least calculate the correction factor by multiplying the second homogeneous matrix and an inverse of the first homogeneous matrix.

11. The non-transitory computer readable storage medium of claim 10, wherein the first homogeneous matrix and the second homogeneous matrix are 4×4 homogeneous matrices.

12. The non-transitory computer readable storage medium of claim 8, further including instructions which, when executed, cause the machine to at least update the model based on the correction factor by:
- generating a set of trajectories associated with the second task;
- determining one of the trajectories in the set with a goal state nearest to the second pose; and
- generating one or more joint states associated with the one of the trajectories by applying the correction factor to the goal state.

13. The non-transitory computer readable storage medium of claim 8, further including instructions which, when executed, cause the machine to at least determine the estimated pre-task position by using the model as a ground truth to determine coordinates of the estimated pre-task position.

14. The non-transitory computer readable storage medium of claim 8, further including instructions which, when executed, cause the machine to at least adjust the robot to the first actual pre-task position by at least one of obtaining an output from a camera system or a sensor measurement from an encoder.

15. A method comprising:
- instructing a robot to move an end effector from a first position to a second position to perform a first task based on a first pose of the robot, the first pose based on a model;
- in response to the robot moving to a third position, adjusting the robot to a fourth position to perform the first task, the fourth position proximate the second position;
- in response to performing the first task, determining a second pose of the robot, the second pose corresponding to position information associated with the robot at a fifth position, the fifth position corresponding to a position of the robot after performing the first task;
- calculating a correction factor based on the first pose and the second pose; and
- directing the robot to perform a second task based on the correction factor.

16. The method of claim 15, wherein the first task includes the robot coupling a first assembly item to a second assembly item.

17. The method of claim 15, wherein the first pose is a first homogeneous matrix and the second pose is a second homogeneous matrix and calculating the correction factor includes multiplying the second homogeneous matrix and an inverse of the first homogeneous matrix.

18. The method of claim 15, further including updating the model based on the correction factor, the updating including:
- generating a set of trajectories associated with the second task;
- determining one of the trajectories in the set with a goal state nearest to the second pose; and
- generating one or more joint states associated with the one of the trajectories by applying the correction factor to the goal state.

19. The method of claim 15, wherein the second position is determined by using the model as a ground truth to determine coordinates of the second position.

20. The method of claim 15, wherein adjusting the robot to the fourth position includes at least one of obtaining an output from a camera system or a sensor measurement from an encoder.

* * * * *